United States Patent
Falahati et al.

(10) Patent No.: US 11,356,218 B2
(45) Date of Patent: Jun. 7, 2022

(54) COMMON CONTROL SIGNALING FOR EFFICIENT SYSTEM OPERATION

(71) Applicant: Telefonaktiebolaget LM Ericsson (publ), Stockholm (SE)

(72) Inventors: Sorour Falahati, Stockholm (SE); Daniel Chen Larsson, Lund (SE); Jung-Fu Cheng, Fremont, CA (US); Havish Koorapaty, Saratoga, CA (US); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 41 days.

(21) Appl. No.: 16/637,842

(22) PCT Filed: Aug. 10, 2018

(86) PCT No.: PCT/EP2018/071749
§ 371 (c)(1),
(2) Date: Feb. 10, 2020

(87) PCT Pub. No.: WO2019/030378
PCT Pub. Date: Feb. 14, 2019

(65) Prior Publication Data
US 2020/0252176 A1    Aug. 6, 2020

Related U.S. Application Data

(60) Provisional application No. 62/544,697, filed on Aug. 11, 2017.

(51) Int. Cl.
*H04L 5/00* (2006.01)
*H04L 5/14* (2006.01)

(52) U.S. Cl.
CPC .......... *H04L 5/0044* (2013.01); *H04L 5/0007* (2013.01); *H04L 5/0094* (2013.01); *H04L 5/1469* (2013.01)

(58) Field of Classification Search
CPC ... H04L 5/0044; H04L 5/0007; H04L 5/0094; H04L 5/1469; H04L 1/0013; H04W 72/044; H04W 72/14; H04B 7/26
See application file for complete search history.

(56) References Cited

U.S. PATENT DOCUMENTS

2018/0070341 A1* 3/2018 Islam ................. H04W 72/044
2019/0342944 A1* 11/2019 Chatterjee ............ H04W 92/10
(Continued)

FOREIGN PATENT DOCUMENTS

CN          107026689 A       8/2017
WO     WO-2017129081 A1 *    8/2017  ............... H04B 7/26

OTHER PUBLICATIONS

LG Electronics, "Discussion on the contents of group common PDCCH", 3GPP TSG RAN WG1 NR Ad Hoc #2, Qingdao, China, Jun. 27, 2017, pp. 1-6, R1-1710310 (Year: 2017).*

(Continued)

*Primary Examiner* — Phirin Sam
*Assistant Examiner* — Louis Samara
(74) *Attorney, Agent, or Firm* — Coats + Bennett, PLLC

(57) ABSTRACT

In a wireless communication system (100), an access node (110) configures, for a user equipment, UE (105), each symbol in a slot (68a) individually as one of multiple possible symbol types. The types including an uplink symbol, a downlink symbol, and a different symbol. The access node (110) transmits, to the UE (105), a slot format indicator, SFI, specifying a number of downlink symbols in the slot (68a) and a number of uplink symbols in the slot (68a), and indicating whether or not the slot (68a) includes an unspecified number of different symbols. The UE (105) receives, from the access node (110), the SFI for the slot (68a), and determines the type of each of the symbols in the (Continued)

slot (68*a*) based on the number of uplink symbols and the number of downlink symbols.

18 Claims, 12 Drawing Sheets

(56) References Cited

U.S. PATENT DOCUMENTS

2020/0067676 A1* 2/2020 Yi .................... H04W 72/042
2020/0344723 A1* 10/2020 Babaei ................ H04W 72/14

OTHER PUBLICATIONS

LG Electronics, "Discussion on the contents of group common PDCCH", 3GPP TSG RAN WG1 NR Ad Hoc #2, Qingdao, China, Jun. 27, 2017, pp. 1-6, R1-1710310.

Rapporteur (Ericsson), "NR-AH1801#19: Corrections on L1 Parameters (except CSI-RS) for EN-DC", Change Request, 3GPP TSG-RAN WG2 Meeting #101, Athens, Greece, Feb. 26, 2018, pp. 1-347, R2-1804125, 3GPP.

Samsung, "Functionalities for UE-Common NR-PDCCH", 3GPP TSG-RAN WG1 #89, Hangzhou, China, May 15, 2017, pp. 1-4, R1-1707997, 3GPP.

Intel Corporation, "Group-common PDCCH: Contents", 3GPP TSG RAN WG1 NR Ad-Hoc#2, Qingdao, P.R. China, Jun. 27, 2017, pp. 1-6, R1-1710548, 3GPP.

LG Electronics, "WF on Slot Format indication with group common PDCCH", 3GPP TSG RAN #89, Hangzhou, China, May 15, 2017, Agenda Item: 7.1.3.1.5, pp. 1-2, R1-1709539, 3GPP.

Catt, "[89-20] email discussion: Group-common PDCCH for NR", 3GPP TSG RAN WG1 Meeting #1AH_NR2, Qingdao, P.R. China, Jun. 27, 2017, pp. 1-22, R1-1710968, 3GPP.

Nokia et al., "On the contents of group common PDCCH in NR3GPP", TSG-RAN WG1 Ad Hoc Meeting #2 Qindgao, China, Jun. 27, 2017, pp. 1-4, R1-1710985.

Ericsson, "On UE Procedures Related to Group-Common PDCCH", 3GPP TSG RAN WG1 NR Ad-Hoc#2, Qingdao, P.R. China, Jun. 27, 2017, pp. 1-4, R1-1711485, 3GPP.

Qualcomm Incorporated, "Ue behavior related to group common Pdcch", 3GPP Tsg Ran WG1 Nr Ad-Hoc#2, Qingdao, p. R China, 2017-06-27, pp. 1-3, R1-1711185, 3GPP.

* cited by examiner

| SFI (Dx, ULx) | SLOT FORMAT | COMMENT |
|---|---|---|
| (0,1) | | UPLINK ONLY |
| (1,1) | | UPLINK HEAVY SLOT, 1 DOWNLINK SYMBOL |
| (2,1) | | UPLINK HEAVY SLOT, 2 DOWNLINK SYMBOLS |
| (14,0) | | DOWNLINK ONLY |
| (13,0) | | DOWNLINK WITH GUARD (NO UPLINK) |
| (12,1) | | DOWNLINK HEAVY SLOT, 1 UPLINK SYMBOL |
| (11,1) | | DOWNLINK HEAVY SLOT, 2 UPLINK SYMBOLS |
| (0,0) | | UNKNOWN SLOT |

☐ = DOWNLINK SYMBOL ▨ = UPLINK SYMBOL ▦ = UNKNOWN SYMBOL

FIG. 4A

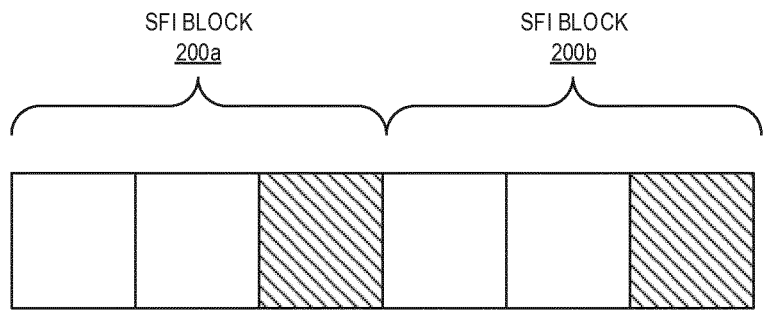

FIG. 5A

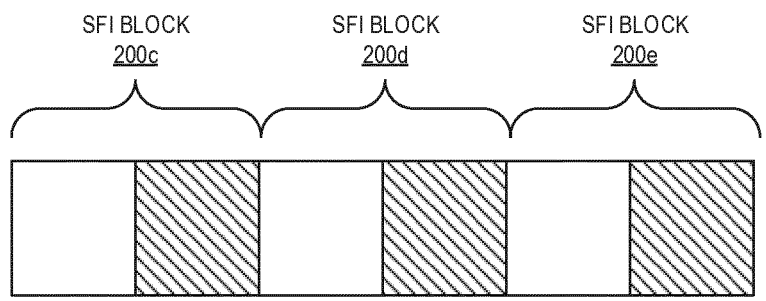

RECEIVING, FROM AN ACCESS NODE, A SLOT FORMAT INDICATOR (SFI) FOR A SLOT THAT IS CONFIGURABLE TO INCLUDE BOTH UPLINK AND DOWNLINK SYMBOLS, THE SFI SPECIFYING A NUMBER OF DOWNLINK SYMBOLS IN THE SLOT AND WHETHER OR NOT THE SLOT INCLUDES AN UNSPECIFIED NUMBER OF UPLINK SYMBOLS
610

DETERMINING, BASED ON THE SFI, A TYPE OF EACH SYMBOL IN THE SLOT AS BEING CONFIGURED FOR ONE OF MULTIPLE POSSIBLE SYMBOL TYPES, WHEREIN THE POSSIBLE SYMBOL TYPES INCLUDE AN UPLINK SYMBOL TYPE AND A DOWNLINK SYMBOL TYPE
620

FIG. 6

COMMON CONTROL SIGNALING FOR EFFICIENT SYSTEM OPERATION

RELATED APPLICATIONS

This application claims the benefit of U.S. Provisional Application No. 62/544,697, filed 11 Aug. 2017, the disclosure of all of which is incorporated by reference herein in its entirety.

TECHNICAL FIELD

The present disclosure generally relates to the field of control signaling in a wireless communication system, and more particularly relates to efficient signaling of slot information.

BACKGROUND

In a wireless communication system, signaling is exchanged between one or more user equipment (UE) and one or more access nodes over a wireless communication medium (e.g., an air interface) using one or more radio frequency (RF) resources. These RF resources are generally finite and often shared. Accordingly, efficient signaling between the UE and the access node is advantageous.

SUMMARY

Embodiments of the present disclosure are directed to aspects of a wireless communication system that comprises a UE and an access node. The access node configures, for the UE, each symbol in a slot individually as one of multiple possible symbol types. The types including an uplink symbol, a downlink symbol, and a different symbol. The access node transmits, to the UE, a slot format indicator (SFI) specifying a number of downlink symbols in the slot and a number of uplink symbols in the slot, and indicating whether or not the slot includes an unspecified number of different symbols. The UE receives, from the access node, the SFI for the slot, and determines the type of each of the symbols in the slot based on the number of uplink symbols and the number of downlink symbols.

More particularly, embodiments herein include a method, implemented by a UE in a wireless communication system. The method comprises receiving, from an access node, an SFI for a slot in which each symbol is independently configurable as one of multiple possible symbol types. The types include an uplink symbol, a downlink symbol, and a different symbol. The SFI specifies a number of downlink symbols in the slot and a number of uplink symbols in the slot, and indicates whether or not the slot includes an unspecified number of different symbols. The method further comprises determining the type of each of the symbols in the slot based on the number of uplink symbols and the number of downlink symbols.

In some embodiments, the SFI indicates that an unspecified number of different symbols is included in the slot.

In some embodiments, the different symbol is a guard symbol.

In some embodiments, the method further comprises monitoring a predefined symbol in the slot for a control resource set that overrides the SFI, irrespective of the type determined for the predefined symbol based on the SFI.

In some embodiments, the method further comprises receiving further control signaling from the access node indicating whether the SFI or a further SFI applies to a subsequent slot in which each symbol is independently configurable as one of the multiple possible symbol types. In some such embodiments, the further control signaling comprises a block size and a repetition factor. In some such embodiments, the method further comprises identifying a first plurality of slots to which the SFI applies based on the block size and repetition factor. Additionally or alternatively, in some embodiments, the method further comprises receiving, from the access node, an update to one of the block size or the repetition factor, and in response, identifying a second plurality of slots to which the SFI applies based on the block size or repetition factor that was updated and the block size or repetition factor that was not updated. Additionally or alternatively, in some embodiments, the SFI and the further control signaling are jointly received in a predefined number of signaling bits. Additionally or alternatively, in some embodiments, the further control signaling comprises the further SFI and indicates that the further SFI applies to the subsequent slot.

Other embodiments include a method, implemented by an access node in a wireless communication system. The method comprises configuring, for a UE, each symbol in a slot individually as one of multiple possible symbol types. The types include an uplink symbol, a downlink symbol, and a different symbol. The method further comprises transmitting, to the UE, an SFI specifying a number of downlink symbols in the slot and a number of uplink symbols in the slot, and indicating whether or not the slot includes an unspecified number of different symbols.

In some embodiments, the SFI indicates that the unspecified number of different symbols is included in the slot.

In some embodiments, the different symbol is a guard symbol.

In some embodiments, the method further comprises transmitting a control resource set that overrides the SFI in a predefined symbol of the slot irrespective of the type configured for the predefined symbol.

In some embodiments, the method further comprises transmitting further control signaling, to the UE, indicating whether the SFI or a further SFI applies to a subsequent slot in which each symbol is independently configurable as one of the multiple possible symbol types. In some such embodiments, the further control signaling comprises a block size and a repetition factor. In some such embodiments, the block size and repetition factor identify a first plurality of slots to which the SFI applies. Additionally or alternatively, in some embodiments, the method further comprises transmitting, to the UE, an update to one of the block size or the repetition factor. The block size or repetition factor that was updated and the block size or repetition factor that was not updated identify a second plurality of slots to which the SFI applies. Additionally or alternatively, in some embodiments, the SFI and the further control signaling are jointly transmitted in a predefined number of signaling bits. Additionally or alternatively, in some embodiments, the further control signaling comprises the further SFI and indicates that the further SFI applies to the subsequent slot.

Other embodiments include a UE in a wireless communication system. In some such embodiments, the UE is configured to perform any of the UE methods described herein.

In some embodiments, the UE comprises a processor and a memory, the memory containing instructions executable by the processor whereby the UE is configured. Additionally or alternatively, in some embodiments, the UE comprises one or more physical units or functional modules whereby the UE is configured.

Other embodiments include an access node in a wireless communication system. In some such embodiments, the access node is configured to perform any of the access node methods described herein.

In some embodiments, the access node comprises a processor and a memory, the memory containing instructions executable by the processor whereby the access node is configured. Additionally or alternatively, in some embodiments, the access node comprises one or more physical units or functional modules whereby the access node is configured.

Other embodiments include computer programs, computer readable storage mediums, and carriers corresponding to any of the methods and/or apparatus described herein.

BRIEF DESCRIPTION OF THE DRAWINGS

FIG. 4A is a table illustrating example Slot Format Indicators (SFIs) describing different slot formats in accordance with one or more embodiments of the present disclosure.

FIGS. 5A and 5B illustrate example repetitive SFI patterns, according to one or more embodiments of the present disclosure.

FIGS. 6-7, 11-14, and 18-19 are flow diagrams illustrating example methods, according to embodiments of the present disclosure.

DETAILED DESCRIPTION

Figure 1:
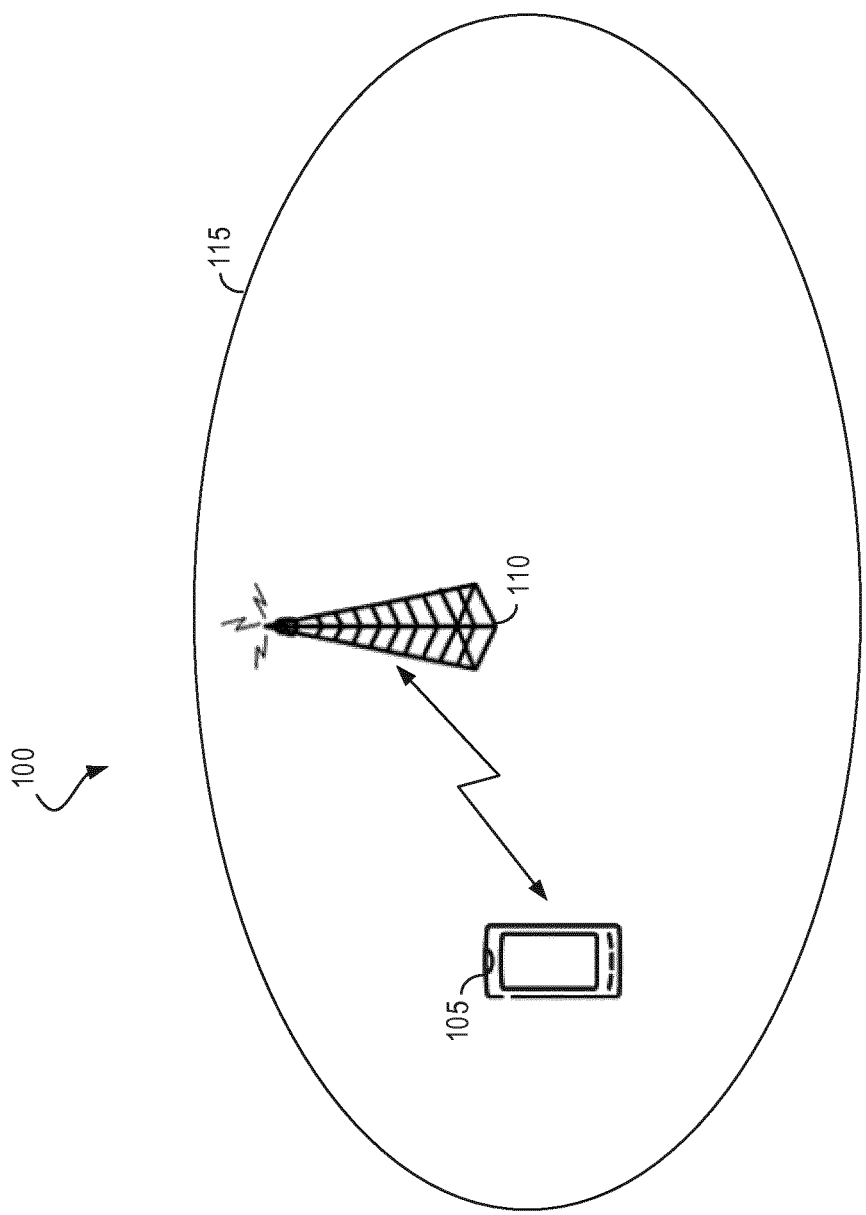
FIG. 1 illustrates an example communication system, according to one or more embodiments of the present disclosure.

FIG. 1 illustrates an example communication system 100 according to one or more embodiments of the present disclosure. Although certain aspects of the communication system 100 may herein be described in the context of a Long-Term Evolution (LTE) communication network, the discussion throughout this disclosure may similarly be applied to other wireless communication systems and/or combinations thereof, including but not limited to 5G Next Radio (NR) and/or Wi-Fi.

The communication system 100 comprises a plurality of wireless communication nodes. One of the wireless communication nodes in particular is an access node 110 that serves a cell 115 to a UE 105. The UE 105 and/or access node 110 may, in some embodiments, each be referred to as a radio node (i.e., a network node capable of radio communication). Further, the access node 110 may be referred to, in some embodiments, as a base station (such as an eNB, gNB), for example. Although only one access node 110 and one UE 105 are illustrated in FIG. 1, other examples of the communication system 100 may include any number of access nodes 110, each of which may serve one or more cells 115 to any number of UEs 105. Further, according to other embodiments, the UE 105 may, instead, be a base station (e.g., a femtocell, relay base station).

Wireless communication between the access node 110 and one or more UEs 105 is performed using radio resources across a time domain, a frequency domain, or both. LTE and NR in particular use OFDM in the downlink. The basic NR or LTE downlink physical resource may be viewed as a time-frequency grid, as illustrated in FIG. 2.

Figure 2:
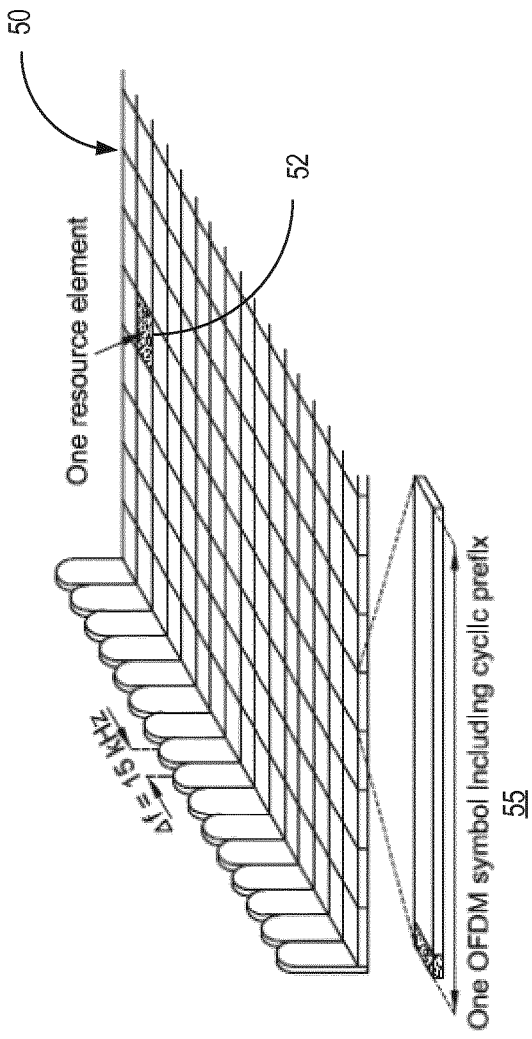
FIG. 2 illustrates an example of physical resources divided across a frequency domain into adjacent subcarriers with a spacing of 15 kHz, in accordance with one or more embodiments of the present disclosure.

FIG. 2 illustrates a portion of an example OFDM time-frequency grid 50, e.g., for LTE and/or NR. Generally speaking, the time-frequency grid 50 is divided into subframes, as will be discussed below. Each subframe includes a plurality of OFDM symbols 55. Each symbol 55 may include a cyclic prefix. The cyclic prefix may be longer or shorter based on conditions. For example, a normal cyclic prefix (CP) length may be used in situations in which multipath dispersion is not expected to be severe. Alternatively, an extended cyclic prefix may be used in situations in which multipath dispersion is expected to be severe. In general, a subframe may comprise fewer symbols 55 when longer cyclic prefixes are used, and more symbols 55 when shorter cyclic prefixes are used.

According to the present example, the physical resources shown in FIG. 2 are divided across the frequency domain into adjacent subcarriers with a spacing of 15 kHz. Other embodiments may include other spacing (i.e., different in the time domain, in the frequency domain, or both). In particular, the number of subcarriers may, in some embodiments, vary according to the allocated system bandwidth. The smallest element of the time-frequency grid 50 is typically referred to as a resource element 52, which comprises one OFDM subcarrier during one OFDM symbol interval.

Figure 3:
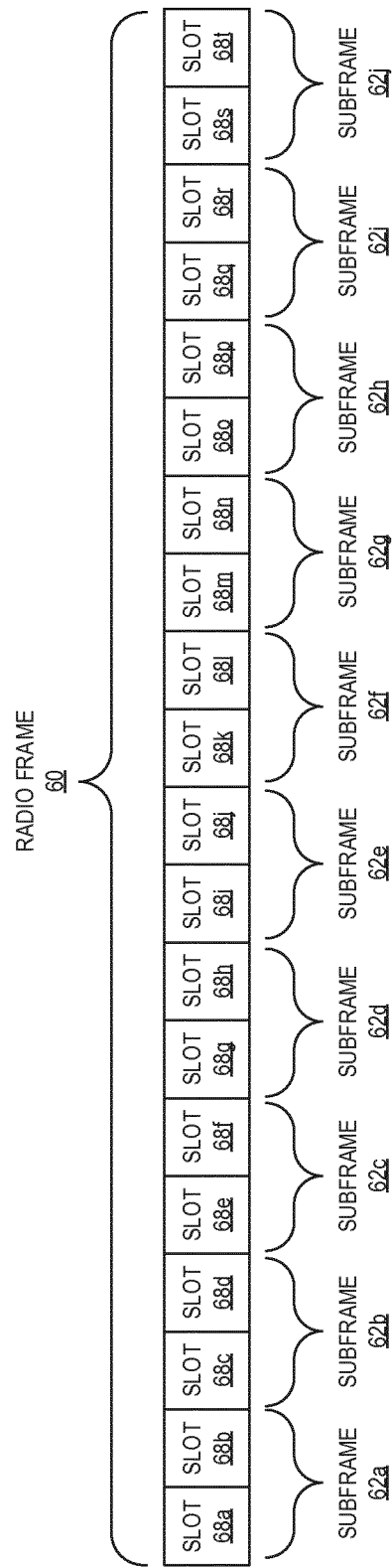
FIG. 3 illustrates an example radio frame, according to one or more embodiments of the present disclosure.

Data is transmitted from the access node 110 to the UE 105 over a downlink transport channel. The downlink transport channel is a time and frequency multiplexed channel shared by a plurality of UEs 105. The downlink transmissions are typically organized into radio frames 60 of a given duration (e.g., ten milliseconds). Each radio frame 60 may comprise a plurality of subframes 62. According to one example, a radio frame 60 may comprise ten equally-sized subframes 62a-j, as shown in FIG. 3. Each subframe 62 may comprise a plurality of slots 68. According to one example, a subframe 62a may comprise two equally-sized slots 68a-b, as shown in FIG. 3. In particular, FIG. 3 illustrates an example in which the radio frame 60 comprises twenty equally-sized slots 68a-t.

According to embodiments, a slot 68 may comprise a plurality of symbols 55, the precise number of which may vary according to the embodiment. For example, a slot 68 may comprise seven or fourteen symbols 55, according to particular embodiments. Further, in some embodiments, the slot duration may be configurable, such that the number of symbols 55 in a slot 68 may, e.g., be set in the UE 105 by the access node 110. Further still, a plurality of symbols 55 fewer than the number of symbols in a slot 68 may be referred to, in some embodiments, as a mini-slot (not shown).

Physical downlink control channels (PDCCHs) may be used, e.g., in NR for downlink control information (DCI). This DCI may, e.g., include downlink scheduling assignments and uplink scheduling grants. The PDCCHs are in general transmitted at the beginning of a slot 68 and relate to data in the same or a later slot. For mini-slots, a PDCCH may also be transmitted within a regular slot. Different formats (e.g., sizes) of the PDCCHs are possible to handle different DCI payload sizes and different aggregation levels (i.e. a given code rate for a given payload size).

According to embodiments, a UE 105 is configured (implicitly and/or explicitly) to blindly monitor (and/or search) for a number of PDCCH candidates of different aggregation levels and DCI payload sizes. Upon detecting a valid DCI message (e.g., the decoding of a candidate is successful and the DCI contains a ID the UE is told to monitor) the UE 105 follows the DCI (e.g., receives the corresponding downlink data or transmits in the uplink). Although the blind decoding process may come at a cost (e.g., requiring additional complexity in the UE 105), this blind decoding may, in some embodiments, provide flexible scheduling and handling of different DCI payload sizes.

Particular embodiments of the present disclosure may include, e.g., a 'broadcasted control channel' that is received by multiple UEs 105 (e.g., according to certain embodiments in which the network 100 supports NR). This channel may, e.g., be referred to as a physical slot format indicator channel (PSFICH), a 'PCFICH-like channel', a 'UE-group common control channel,' a 'common PDCCH,' and/or a "group-common PDCCH." For purposes of this disclosure, these names may be used interchangeably. Further, although these specific terms may be used within this disclosure, various embodiments described herein may similarly be applied to other channels. Indeed, embodiments herein may be applicable to any channel that provides control signaling between an access node 110 and a UE 105, for example.

One example of information that might be put in such a channel is information about the slot format. In particular, the channel may carry information about whether a certain slot 68 is an uplink or downlink slot. The channel may additionally or alternatively carry information about which portion(s) of a slot 68 are for the uplink and/or the downlink. Such information may, in many embodiments, be useful in a dynamic TDD system. Further, this information may be provided on the symbol level for one or more slots 68.

In some embodiments, the common PDCCH may indicate the length of the control region, i.e., the number of OFDM symbols 55 used for control signaling. Embodiments of the common PDCCH are not necessarily limited to one specific structure for indicating the control region size, however. In particular, the common PDCCH may be designed to be extended to support future enhancements, e.g., by carrying additional information. Indeed, embodiments of the present disclosure may include a variety of different signaling structures in support of uplink and/or downlink communication.

Particular embodiments of the present disclosure may include control signals that are common among a group of UEs 105, e.g., to enable functionality that improves system operation. For example, power consumption in a group of UEs 105 may be reduced if the UEs 105 are informed about time periods in which they are not scheduled for communication. The UEs 105 may, in response, save power by not monitoring the channel during such time periods. Accordingly, embodiments of the present disclosure may provide 'slot related information" to a UE 105 on the symbol level for one of multiple slots 68.

In particular, when this slot related information is provided (e.g., by appropriate signaling from the access node 110), the UE 105 may be able to determine whether a symbol 55 contains a downlink transmission, an uplink transmission, or neither of them (e.g., the symbol 55 may be considered as 'unknown' and/or may use further information as a basis for determining how the symbol 55 is configured).

That said, although such information may be beneficial in a variety of deployment scenarios (i.e., according to one or more embodiments) such a signal may be optional (e.g., an add-on signal to other control signaling) such that corresponding functionality enabled by detection of this signal is not crucial for proper operation. Notwithstanding, a low complexity design for such signaling may be advantageous in some embodiments, as additional complexity is often weighed as a cost against the benefits provided by such additional signaling.

For example, in order to provide sufficient power saving benefit to a UE 105, 'slot related information' spanning multiple slots 68 may be required. Such may particularly be the case in embodiments in which slots 68 include fewer symbols 55 (e.g., seven symbols 55, as compared with fourteen symbols 55 per slot 68). That said, additional signaling may be required in order to convey this information from the access node 110 to the UE 105, for example. Indeed, in some cases, the consequence of providing this 'slot related information' for multiple slots 68 may considerably increase the amount of additional signaling. Accordingly, embodiments of the present disclosure use efficient signaling to provide information about transmission (e.g., 'slot related information' in support of NR) while enabling certain intended functionalities. In particular, certain embodiments of the present disclosure may provide this 'slot related information' that is reduced as compared with other signaling that would be required in certain other contexts (e.g., certain legacy networks). Particular embodiments enable providing slot related information for a period of time (e.g., one or multiple slots) in a control signaling common to a group of UEs (e.g., a group common PDCCH in NR).

According to embodiments, a group-common PDCCH provides slot related information for one or more slots 68. The information is provided on the symbol level. This slot related information may be interchangeably referred to as slot related information or an SFI, for example. According to embodiments, this SFI indicates to the UE 105, for a given slot 68, the type or types of symbols in the slot 68. In particular, the SFI may indicate whether a particular symbol within the slot is configured as a downlink symbol, an uplink symbol, or neither (e.g., an unknown symbol, an unspecified symbol, a guard symbol).

According to an example in which each symbol 55 in a slot 68 may be either an uplink symbol, a downlink symbol, or an unknown symbol, slot information, there would be many possible combinations. Addressing all of these combinations may require a significant amount of signaling overhead. Accordingly, embodiments of the present disclosure limit the signaling used for the SFI to certain combinations of symbol types. In particular, the SFI may specifically support certain configurations of the slot that follow certain rules in order to keep the size and/or amount of control signaling with respect to slot information 68 low.

For example, in some embodiments, SFI signaling may take advantage of a presumed ordering of symbol types within a slot 68. For example, in a slot 68 that includes both downlink and uplink transmissions, the downlink symbols in the slot 68 may precede the uplink symbols (or vice versa). Moreover, symbols used for a guard period in which the UE 105 switches between downlink and uplink may between the downlink and uplink symbols. Further, this guard period capability of the UE 105 may be known and used to support the efficient signaling of this SFI. Further still, if is information provided about one transmission direction (e.g., the number of uplink or downlink symbols in the slot 68), embodiments may use an indicator for the other transmission direction to signal whether the transmission in the other direction is configured to be present or not.

Consider an example in which the UE 105 is configured with, expects, and/or is able to determine the slot duration, denoted herein by N. For example, the UE 105 may be configured (e.g., via Radio Resource Control signaling) to use either seven or fourteen symbols 55 in support of NR based communication. In addition, the guard period (in number of symbols) is denoted by G here, and is semi-statically configured per UE 105. Further, according to this example, a slot 68 that configured with downlink symbols may be presumed to start with those downlink symbols for use in downlink transmission, followed by any uplink symbols for use in uplink transmission (if present). According to these example rules, and with the two RRC parameters N and G configured, a first field and a second field in the group-common PDCCH may be included in the SFI for a given slot, x.

The first field may be the number of downlink symbols in the slot x, denoted by Dx. The value of Dx may be from 0 to N. That is, the slot x may have no downlink symbols, or all of the N symbols may be downlink symbols, as specified by the value of Dx. For a slot duration of 7 and 14 symbols, 3 and 4 bits are needed, respectively, to signal the value of Dx. The second field may be an uplink transmission indicator for the slot x, denoted by ULx. This uplink transmission indicator may indicate the presence or absence of an uplink transmission in the slot x. Accordingly, only one bit may be needed for this indicator. Based on the above information, the UE 105 can determine (in addition to the number of downlink symbols in the slot x, Dx) the number of uplink symbols, Ux, as well as 'UnKnown' symbols (denoted by Kx) as in the following example.

If there is no uplink transmission in the slot x (i.e., ULx=0), the first Dx symbols are determined to be downlink symbols followed by some number of unknown symbols, Kx, according to the formula Kx=N−Dx.

If there is only uplink transmission in the slot x (i.e. Dx=0 and ULx=1), the slot x is assumed to be an uplink only slot (i.e. Ux=N and Kx=0).

If there are both downlink and uplink transmissions configured for the slot x (i.e., Dx>0 and ULx=1), the slot x starts with Dx downlink symbols and ends with some number of uplink symbols Ux according to the formula Ux=N−(Dx+G), with Kx=G symbols in between. In such a scenario, guard symbols are the unknown symbols Kx. That is, the same SFI may be used for a group of UEs, each of which may be configured with a respective number of symbols to use as a guard period. Accordingly, the SFI information may allow for some unknown symbols in between the uplink and downlink symbols. However, the UE 105, may nonetheless determine these unknown symbols to be guard symbols.

FIG. 4A illustrates examples of the SFI expressed as (Dx, ULx) to describe different slot formats in accordance with the example rules described above. Each of the example slot formats illustrated in FIG. 4A represents a single slot 68 comprising fourteen symbols 55. According to this example, the UE 105 is configured with a one symbol guard interval for switching between downlink and uplink.

Based on the rules described above, and as illustrated in FIG. 4A, a downlink only slot may be specified by (and determined from) Dx=N (i.e., in this example, Dx=14) and ULx=0. Further, an uplink only slot may be specified by (and determined from) Dx=0 and ULx=1.

The SFI may, in one or more embodiments, be extended to apply to multiple slots such that corresponding signaling in the group-common control is efficiently scaled. According to some such embodiments, a particular structure may indicate a repetitive SFI pattern in which SFIs corresponding to a block of slots may be repeated. This may be achieved, in some embodiments, by signaling the corresponding block size in number of slots (denoted by X), and the repetition factor (denoted by R). The signaling of these parameters may be done semi-statically. When one or both of these parameters are semi-statically configured, or are known to the UE 105 by other means, the UE 105 complexity may be reduced (e.g., as compared to configuring these parameters dynamically for each slot, i.e., without one or both of the parameters being semi-statically configured) because the number of corresponding fields in the control signaling for SFI would be known to the UE 105 in advance. For example, in an embodiment in which the repetition factor is semi-statically configured, the control signaling size may be reduced by the repetition factor. In other words, the number of SFI fields can be reduced from X*R to X, where the UE 105 can assume that the SFI received from control signaling is repeated R times.

An example in which a repetitive SFI pattern is applied over six slots 68 is illustrated in FIG. 5A. The example of FIG. 5A includes SFI blocks 200a, 200b. Configuration of the repetitive SFI pattern over the six slots 68 in FIG. 5A may be signaled according to the SFI block size X=3 and repetition factor R=2. Another example in which a repetitive SFI pattern is applied over six slots 68 is illustrated in FIG. 5B. The example of FIG. 5B includes SFI blocks 200c-e. Configuration of the repetitive SFI pattern over the six slots 68 in FIG. 5B may be signaled according to the SFI block size X=2 and repetition factor R=3.

In some of the embodiments discussed herein, the UE 105 will need to know the number of bits in the SFI in order to perform correct decoding of the received signal. For instance, in some embodiments in which SFI is provided for only a single slot 68 that is seven OFDM symbols long, 4 bits may be used. Correspondingly, eight bits may be used for SFI that is provided for two such slots 68. In embodiments in which SFI is provided for three identical slots 68, then 8+2=10 bits may be used, where the last 2 bits are used to express the repetition factor, R, e.g., for values of R between zero and three.

In one such embodiment, the UE 105 may be required to perform blind decoding amongst these three scenarios and check which one applies. Such blind decoding may, however, require additional UE complexity, which may, in turn, cause additional latency. Error detection coding (such as CRC coding) of the information bits may also be required in such embodiments, which may reduce coverage of the common control signal.

Accordingly, particular embodiments use joint encoding of the above three use cases using a fixed information size. In one non-limiting example embodiment using a slot size of seven symbols, a fixed number of information bits are used. Specifically, eight information bits may be used, the first four of which may be used as taught above (e.g., as shown in FIG. 4A) to indicate the SFI pattern for the slot 68.

The second four bits may be interpreted differently depending on their value. For example, if the second four bits signals any value pair other than (7,1), then this signals an SFI pattern for the next slot as discussed above (e.g., as shown in FIG. 4A). Thus, the 8 information bits include two four bit sets that are used to signal the SFI patterns for two slots, respectively. If the second four bits signals the value pair of (7,1), then it signals the SFI patterns of the next two slots are according to the pattern signaled by the first four bits. Thus, the eight information bits are used to signal the SFI pattern for three slots.

In another non-limiting example embodiment in which a slot size of 14 symbols is used, a fixed size of ten information bits are used. The first five bits are used as taught above to indicate the SFI pattern for the current slot (e.g., signaling values that may be interpreted as the Dx and ULx discussed above). If the second five bits signals any value pair other than (14,1), (15,0) or (15,1), then the second five bits signal an SFI pattern for the next slot (e.g., as shown in FIG. 4A above). In this case, the ten information bits are used to signal two SFI patterns for two respective slots.

Alternatively, if the second five bits signal the value pair of (14,1), then the second five bits signal the SFI patterns of the next two slots are according to the pattern signaled by the first five bits. In this case, the ten information bits are used to signal the SFI patterns for three slots in total.

Alternatively, if the second five bits signal the value pair of (15,0), then the second five bits signal the SFI patterns of the next three slots are according to the pattern signaled by the first five bits. In this case, the ten information bits are used to signal the SFI patterns for four slots in total.

Alternatively if the second five bits signal the value pair of (15,1), then the second five bits signal the SFI patterns of the next four slots are according to the pattern signaled by the first five bits. In this case, the ten information bits are used to signal the SFI patterns for five slots in total.

Of course, the above embodiments are merely examples that apply the principles herein to fixed information bit sizes of eight bits and ten bits. Similar principles may further be applied as discussed above in other embodiments using similar encoding values or using a different number of information bits.

Figure 4B:
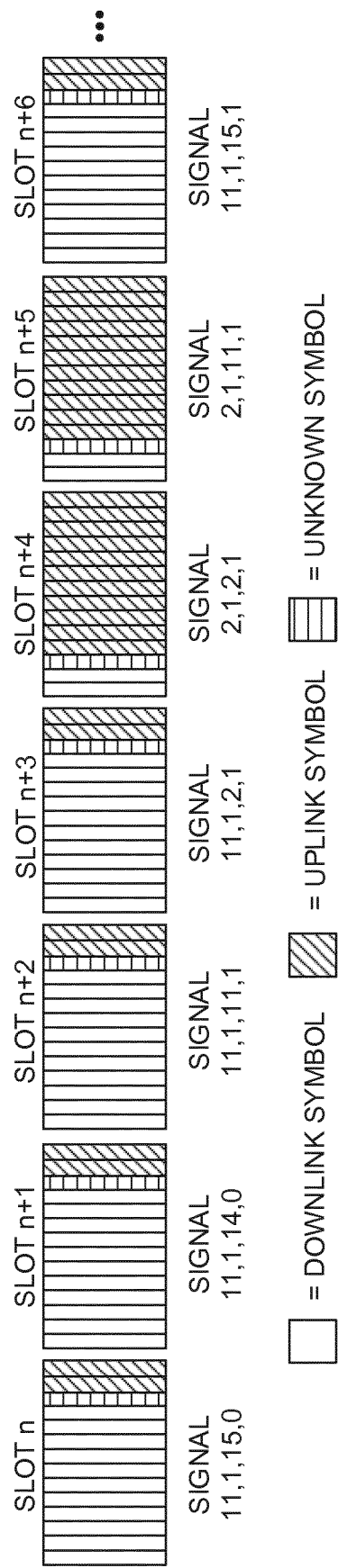
FIG. 4B illustrates example control signaling used to signal SFI, according to one or more embodiments of the present disclosure.

FIG. 4B illustrates example control signaling used to signal SFI for multiple slots 68. As shown in FIG. 4B, in slot n, the common control signal uses (11,1,15,0) to indicate that slots n, n+1, n+2 and n+3 all have 11 downlink symbols 2 uplink symbols.

In slot n+2, the signal (11,1,11,1) indicates slots n+2 and n+3 have 11 downlink symbols and 2 uplink symbols.

In slot n+3, the signal (11,1,2,1) indicates this slot has 11 downlink symbols and 2 uplink symbols and the next slot has 2 downlink symbols and 11 uplink symbols.

In slot n+6, the common control signal uses (11,1,15,1) to indicate that slots n+6, n+7, . . . , n+10 all have 11 downlink symbols and 2 uplink symbols.

In some embodiments, there may be one or more slots 68 that are irregular. That is, one or more slots 68 may not follow the uplink/downlink split indicated in their corresponding SFIs, e.g., as discussed above. In particular, there may be a need to transmit certain traffic that is sensitive to delay (e.g., and for which the corresponding semi-statically configured SFI is not appropriate). To support these irregular slots 68, a downlink transmission may, in some embodiments, be transmitted in any symbol 55 in the slot 68 to schedule downlink transmission and/or uplink transmission (e.g., to override the SFI signaled as discussed above). Such a transmission may be referred to as a 'mini-slot' transmission (particularly in NR-related embodiments), and may in some embodiments, start at any symbol 55 in the slot 68 irrespective of the slot boundary.

More particularly, one or more UEs 105 may, according to particular embodiments, monitor for a control resource set (CORESET), where control signaling for the channel is expected on specific occasions (e.g., the sixth symbol 55 in a slot 68 of fourteen symbols), irrespective of SFI information for particular slots 68. Where the control signaling should be expected, and on what occasions (e.g., which slot should be monitored) may be comprised in the properties of the CORESET, for example.

Accordingly, the UE 105 may receive SFIs from a common control signaling irrespective of the SFIs received for symbols 55 that the UE is configured with according to the CORESET mentioned above. Thus, the UE 105 may use the SFIs from the common control signaling, yet nonetheless monitor the symbol(s) configured by the CORESET to find out whether or not there is any irregular traffic scheduled for transmission.

In a similar manner the UE 105 may transmit on a resource configured for uplink SPS/uplink resource, without an uplink grant or scheduling request (SR), irrespective of the SFI information of particular slots 68, in certain cases in which the UE 105 has information to send. Similar to the CORESET configuration discussed above, this may be done as a property of the SR and UL SPS/UL resource configuration. Further, similar aspects may apply for an uplink grant that is dynamically scheduled for a slot that is indicated to be either DL or unknown in its slot format. Whether the uplink grant applies may be based on configuration in general or based on the transmission profile/link control protocol (LCP) that is associated with the uplink grant or that the uplink grant is scheduled from a CORESET that has these priorities. Further the same aspect may also apply for hybrid automatic repeat request (HARQ) feedback for Physical Downlink Shared Channel (PDSCH) transmissions coming from a CORESET that has the properties mentioned above.

In view of all of the above, one particular embodiment of the present disclosure includes the method 600 illustrated in FIG. 6. The method 600 is implemented by a UE 105 in a wireless communication system 100. The method 600 comprises receiving, from an access node 110, an SFI for a slot 68 that is configurable to include both uplink and downlink symbols (block 610). The SFI specifies a number of downlink symbols in the slot 68 and whether or not the slot 68 includes an unspecified number of uplink symbols. The method 600 further comprises determining, based on the SFI, a type of each symbol 55 in the slot 68 as being configured for one of multiple possible symbol types (block 620). The possible symbol types include an uplink symbol type and a downlink symbol type.

Figure 7:
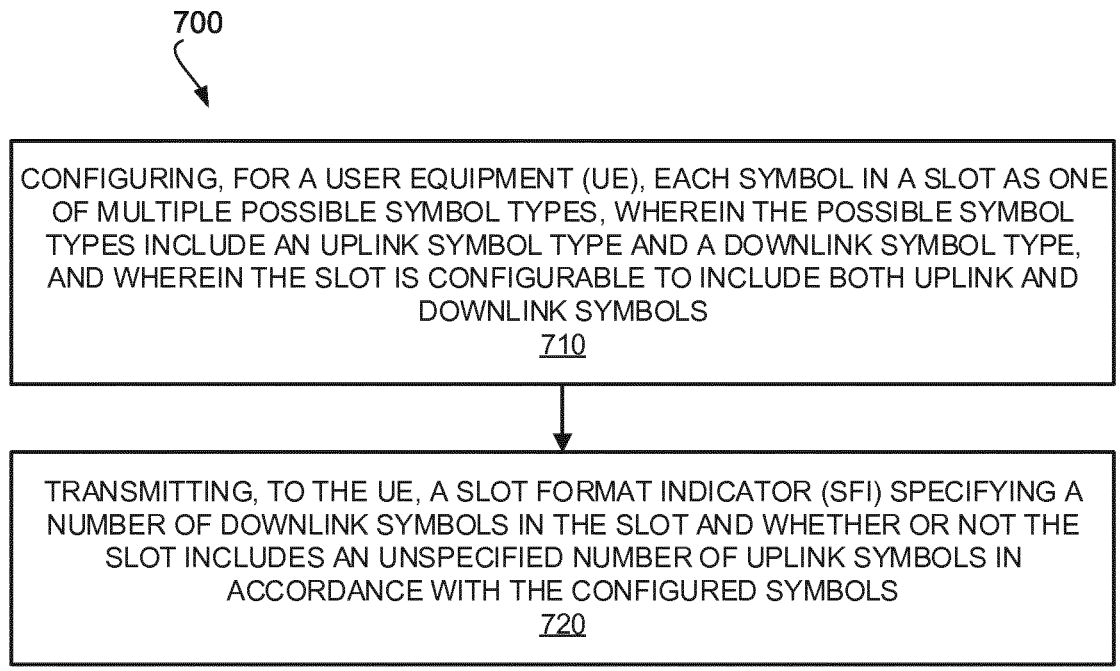

Another particular embodiment of the present disclosure includes the method 700 illustrated in FIG. 7. The method 700 is implemented by an access node 110 in a wireless communication system 100. The method 700 comprises configuring, for a UE 105, each symbol 55 in a slot 68 as one of multiple possible symbol types (block 710). The possible symbol types include an uplink symbol type and a downlink symbol type. Further, the slot 68 is configurable to include both uplink and downlink symbols. The method 700 further comprises transmitting, to the UE 105, an SFI specifying a number of downlink symbols in the slot 68 and whether or not the slot 68 includes an unspecified number of uplink symbols in accordance with the configured symbols 55.

Figure 11:
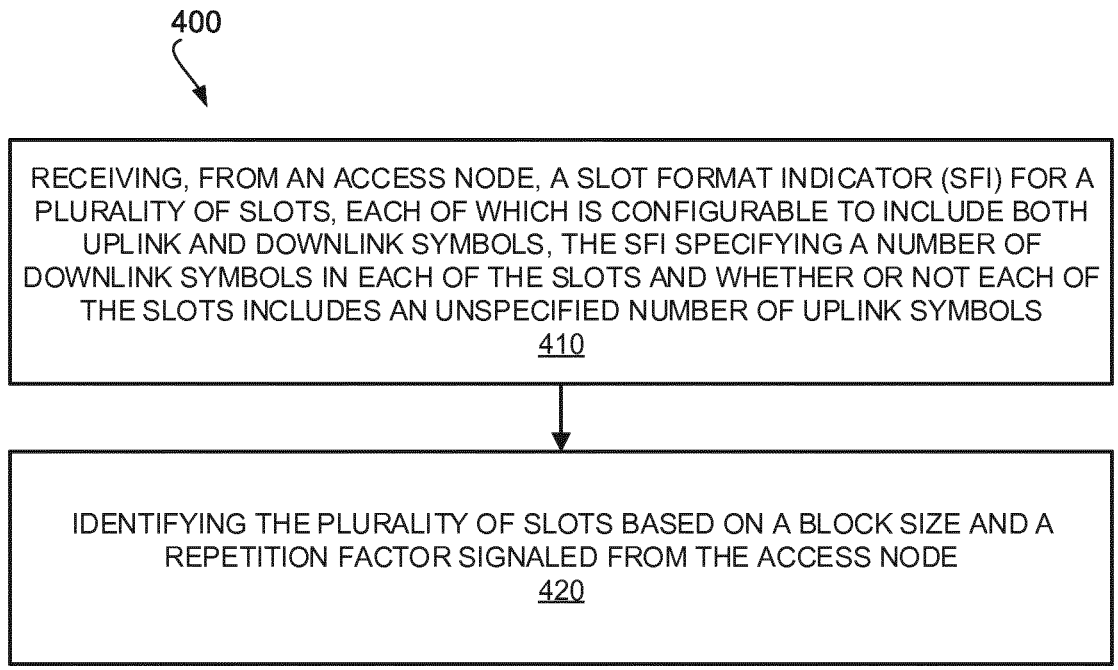

Another particular embodiment of the present disclosure includes the method 400 illustrated in FIG. 11. The method 400 is implemented by a UE 105 in a wireless communication system 100. The method 400 comprises receiving, from an access node 110, an SFI for a plurality of slots 68, each of which is configurable to include both uplink and downlink symbols (block 410). The SFI specifies a number of downlink symbols in each of the slots 68 and whether or not each of the slots 68 includes an unspecified number of uplink symbols. The method 400 further comprises identifying the plurality of slots 68 based on a block size and a repetition factor signaled from the access node 110 (block 420).

Figure 12:
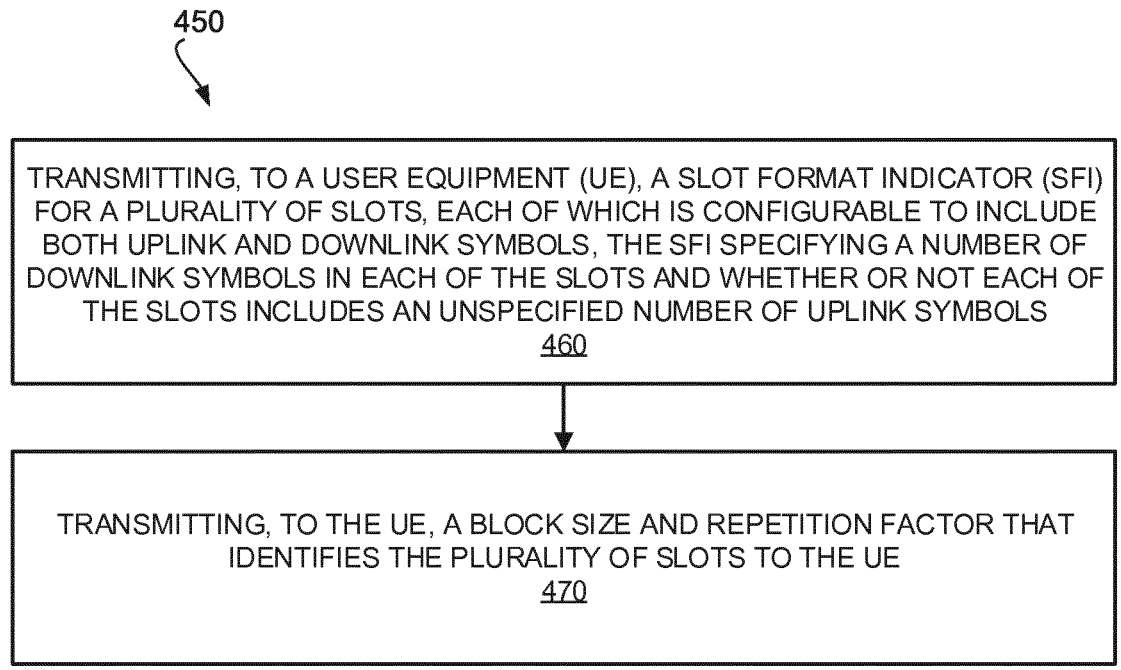

Another particular embodiment of the present disclosure includes the method 450 illustrated in FIG. 12. The method 450 is implemented by an access node 110 in a wireless communication system 100. The method 450 comprises transmitting, to a UE 105, an SFI for a plurality of slots 68, each of which is configurable to include both uplink and downlink symbols (block 460). The SFI specifies a number of downlink symbols in each of the slots 68 and whether or not each of the slots 68 includes an unspecified number of uplink symbols. The method 450 further comprises transmitting, to the UE 105, a block size and repetition factor that identifies the plurality of slots 68 to the UE 105 (block 470).

Figure 13:
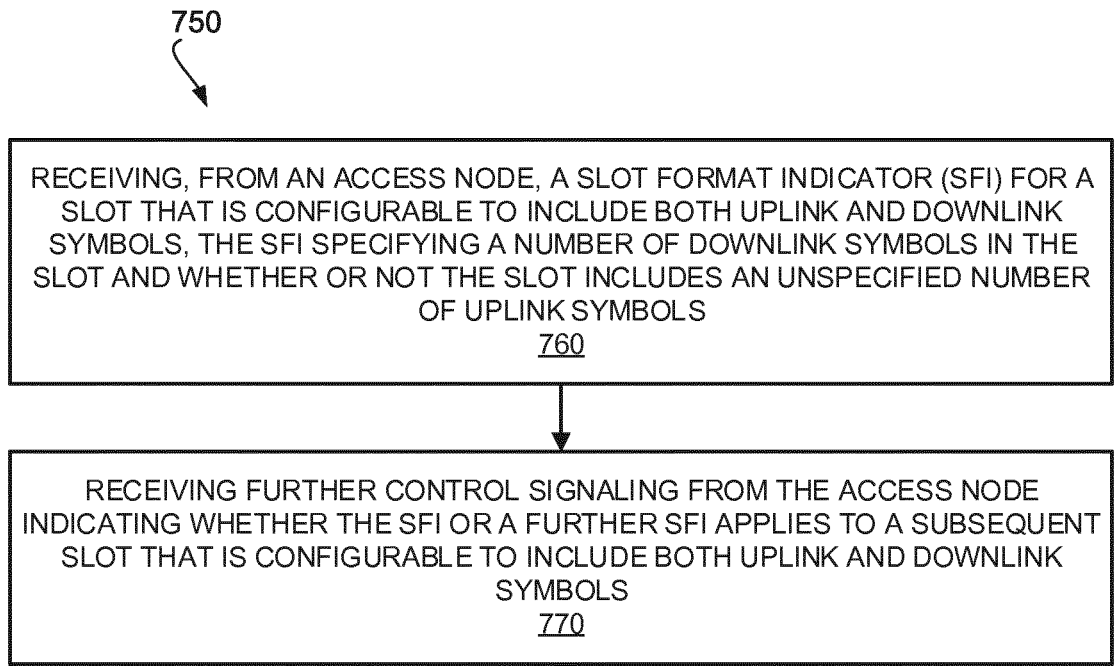

Another particular embodiment of the present disclosure includes the method 750 illustrated in FIG. 13. The method 750 is implemented by a UE 105 in a wireless communication system 100. The method 750 comprises receiving, from an access node 110, an SFI for a slot 68a that is configurable to include both uplink and downlink symbols (block 760). The SFI specifies a number of downlink symbols in the slot 68a and whether or not the slot 68a includes an unspecified number of uplink symbols. The method 750 further comprises receiving further control signaling from the access node 110 indicating whether the SFI or a further SFI applies to a subsequent slot 68b that is configurable to include both uplink and downlink symbols (block 770).

Figure 14:
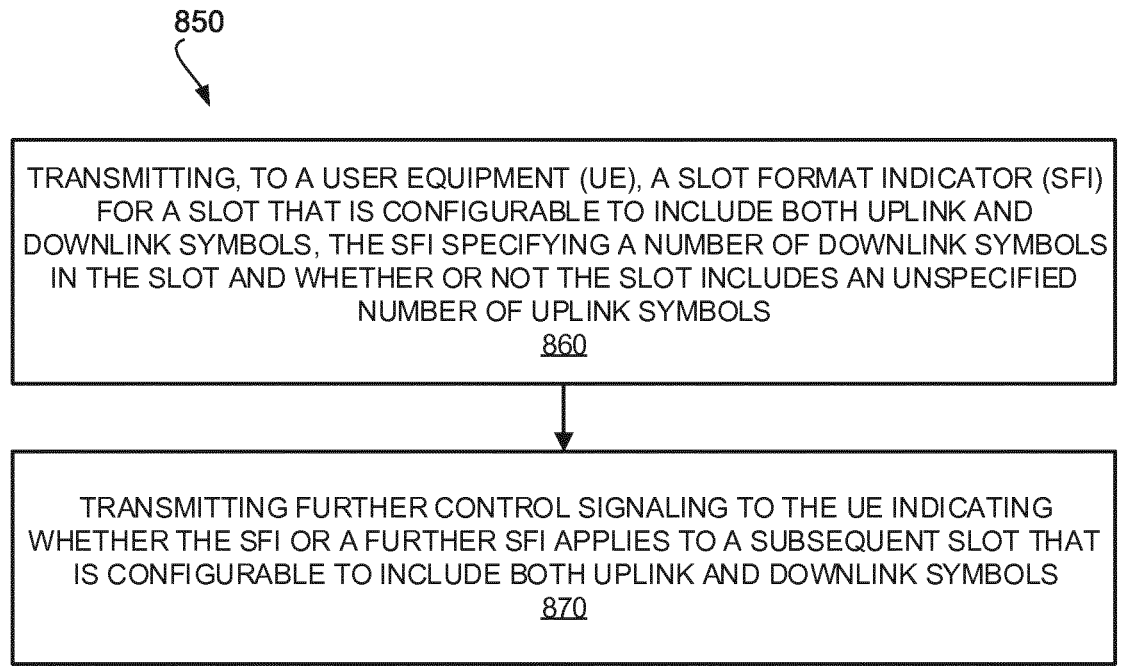

Another particular embodiment of the present disclosure include the method 850 illustrated in FIG. 14. The method 850 is implemented by an access node 110 in a wireless communication system 100. The method comprises transmitting, to a UE 105, an SFI for a slot 68a that is configurable to include both uplink and downlink symbols (block 860). The SFI specifies a number of downlink symbols in the slot 68a and whether or not the slot 68a includes an unspecified number of uplink symbols. The method 850 further comprises transmitting further control signaling to the UE 105 indicating whether the SFI or a further SFI applies to a subsequent slot 68b that is configurable to include both uplink and downlink symbols (block 870).

Figure 18:
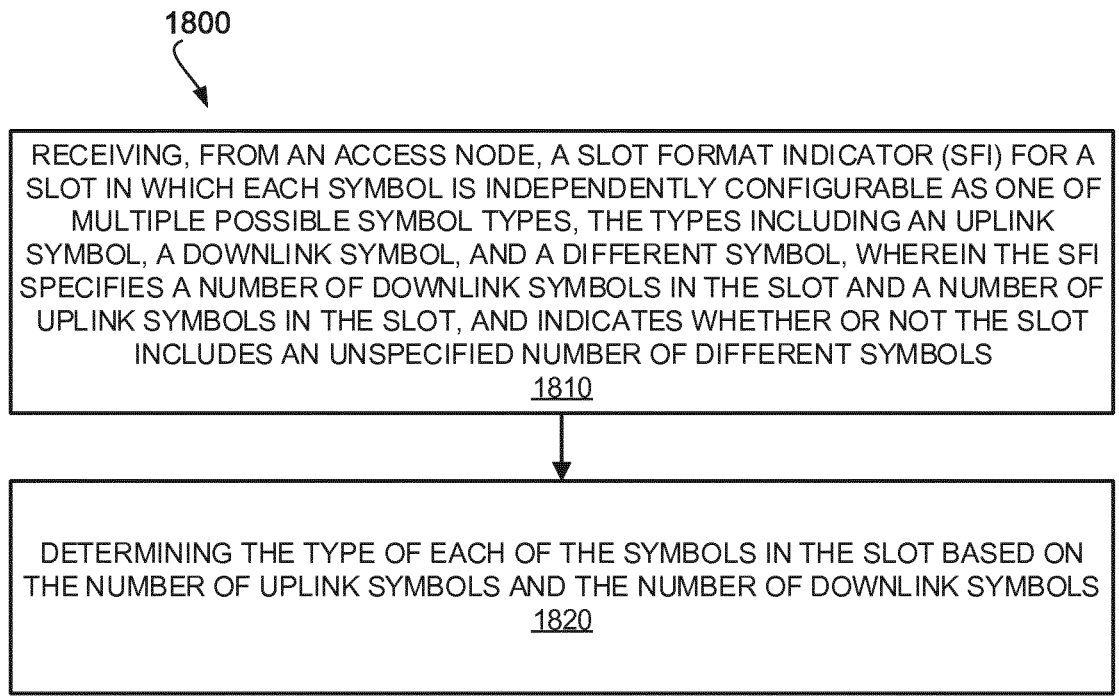

Another particular embodiment of the present disclosure include the method 1800 illustrated in FIG. 18. The method 1800 is implemented by a UE 105 in a wireless communication system 100. The method 1800 comprises receiving, from an access node 110, an SFI for a slot 68a in which each symbol is independently configurable as one of multiple possible symbol types (block 1810). The types include an uplink symbol, a downlink symbol, and a different symbol. The SFI specifies a number of downlink symbols in the slot 68a and a number of uplink symbols in the slot 68a, and indicates whether or not the slot 68a includes an unspecified number of different symbols. The method 1800 further comprises determining the type of each of the symbols in the slot 68a based on the number of uplink symbols and the number of downlink symbols (block 1820).

Figure 19:
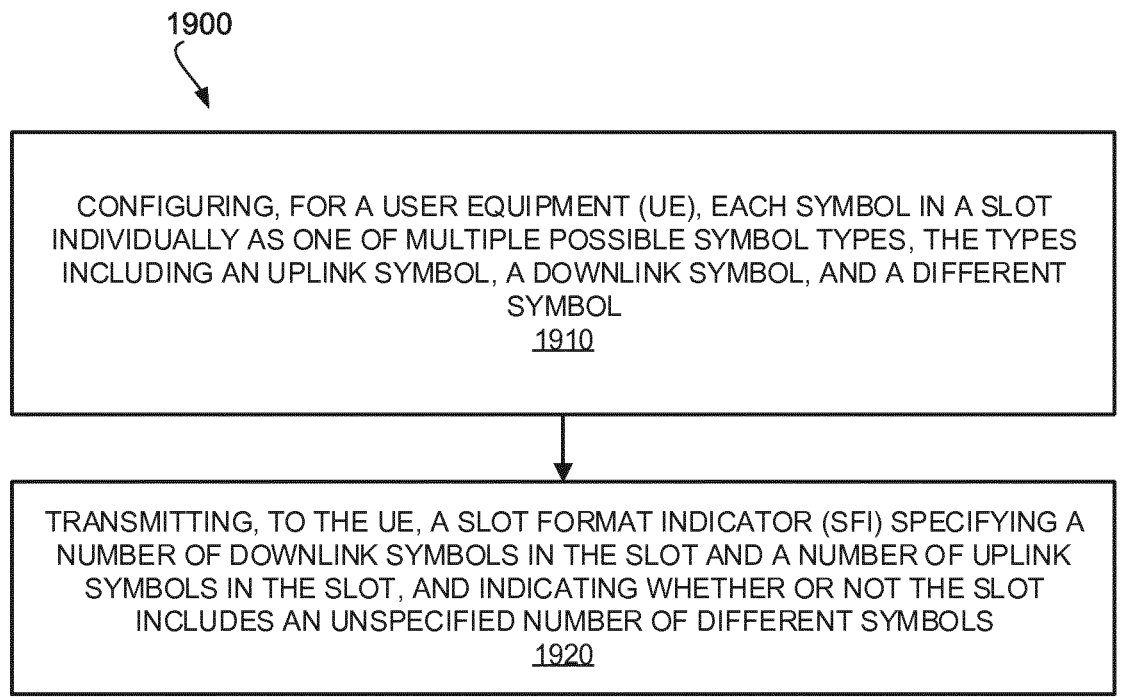

Another particular embodiment of the present disclosure include the method 1900 illustrated in FIG. 19. The method 1900 is implemented by an access node 110 in a wireless communication system 100. The method 1900 comprises configuring, for a UE 105, each symbol in a slot 68a individually as one of multiple possible symbol types (block 1910). The types include an uplink symbol, a downlink symbol, and a different symbol. The method 1900 further comprises transmitting, to the UE 105, an SFI specifying a number of downlink symbols in the slot 68a and a number of uplink symbols in the slot 68a, and indicating whether or not the slot 68a includes an unspecified number of different symbols (block 1920).

Figure 8:
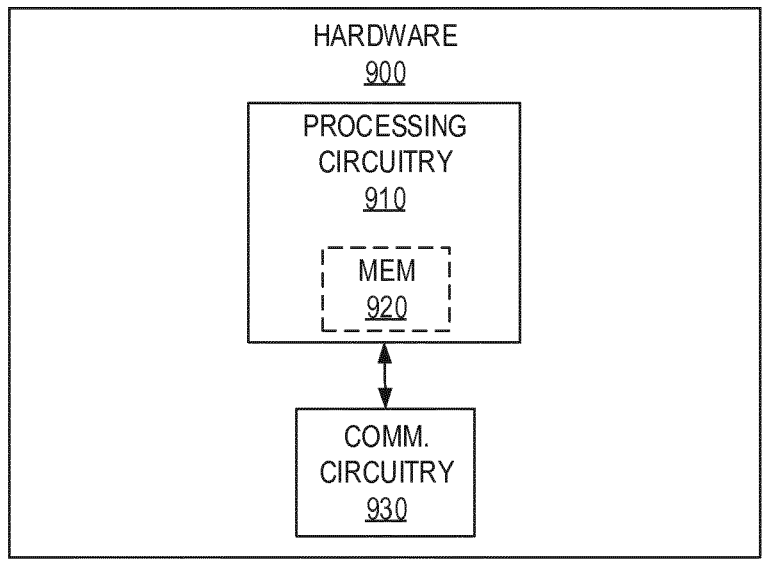
FIG. 8 is a block diagram illustrating example hardware, according to one or more embodiments of the present disclosure.

Moreover, one or more of the devices and/or methods described above may be implemented using the example hardware 900 illustrated in FIG. 8. The example hardware 900 comprises processing circuitry 910 and communication circuitry 930. The processing circuitry 910 is communicatively coupled to the communication circuitry 930, e.g., via one or more buses. The processing circuitry 910 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 910 may be programmable hardware capable of executing software instructions stored as a machine-readable computer program in memory circuitry 920. The memory circuitry 920 of the various embodiments may comprise any non-transitory machine-readable media known in the art or that may be developed, whether volatile or non-volatile, including but not limited to one or more hardware registers, solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drives (e.g., magnetic hard disk drive), and/or any combination thereof.

The communication circuitry 930 may be a controller hub configured to control the input and output (I/O) data paths of the hardware 900. Such I/O data paths may include data paths for exchanging signals over a wireless communication network 100. For example, the communication circuitry 930 may comprise a transceiver configured to send and receive communication signals within and/or between the UE 105 and the access node 110, e.g., over an air, electrical, and/or optical medium.

Although some embodiments of the communication circuitry 930 may be implemented as a unitary physical component, other embodiments of the communication circuitry 930 may be implemented as a plurality of physical components that are contiguously or separately arranged, any of which may be communicatively coupled to any other, and/or may communicate with any other via the processing circuitry 910. For example, in some embodiments, the communication circuitry 930 may comprise transmitter circuitry (not shown) configured to send communication signals, and receiver circuitry (not shown) configured to receive communication signals.

According to particular embodiments, the hardware 900 illustrated in FIG. 8 may be configured with a plurality of components. These components may include a plurality of communicatively coupled hardware units and/or software modules. One or more of the hardware units may be, e.g., part of the processing circuitry 910. One or more of the software modules may be, e.g., stored in the memory circuitry 920 and executable by the processing circuitry 910.

Figure 9:
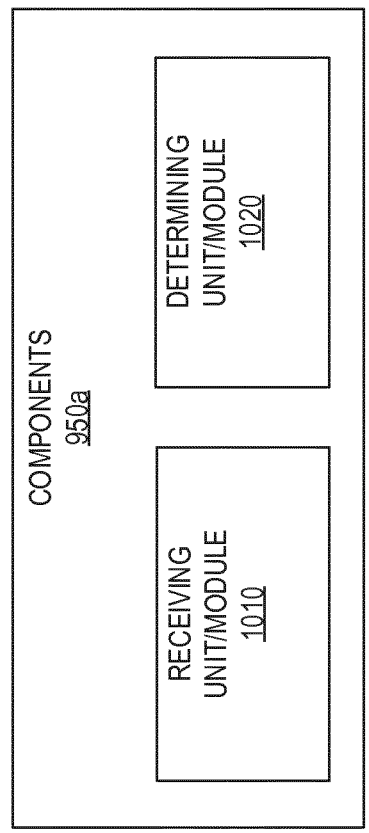

For example, the hardware 900 may be comprised in a UE 105 and configured with the example components 950a illustrated in FIG. 9. The components 950a include a receiving unit or module 1010 and a determining unit or module 1020. The receiving unit or module 1010 is configured to receive, from an access node 110, an SFI for a slot 68 that is configurable to include both uplink and downlink symbols. The SFI specifies a number of downlink symbols in the slot 68 and whether or not the slot 68 includes an unspecified number of uplink symbols. The determining unit or module 1020 is configured to determine, based on the SFI, a type of each symbol 55 in the slot 68 as being configured for one of multiple possible symbol types. The possible symbol types include an uplink symbol type and a downlink symbol type.

Figure 10:
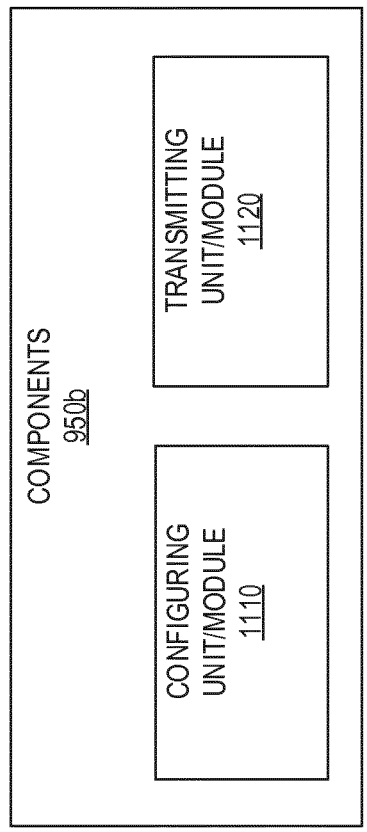
FIGS. 9-10, 15-17, and 20-21 are block diagrams illustrating example components, according to one or more embodiments of the present disclosure.

According to other embodiments, the hardware 900 may be comprised in an access node 110 and configured with the example components 950b illustrated in FIG. 10. The components 950b include a configuring unit or module 1110 and a transmitting unit or module 1120. The configuring unit or module 1110 is configured to configure, for a UE 105, each symbol 55 in a slot 68 as one of multiple possible symbol types. The possible symbol types include an uplink symbol type and a downlink symbol type. Further, the slot 68 is configurable to include both uplink and downlink symbols. The transmitting unit or module 1120 is configured to transmit, to the UE 105, an SFI specifying a number of downlink symbols in the slot 68 and whether or not the slot 68 includes an unspecified number of uplink symbols in accordance with the configured symbols 55.

Figure 15:
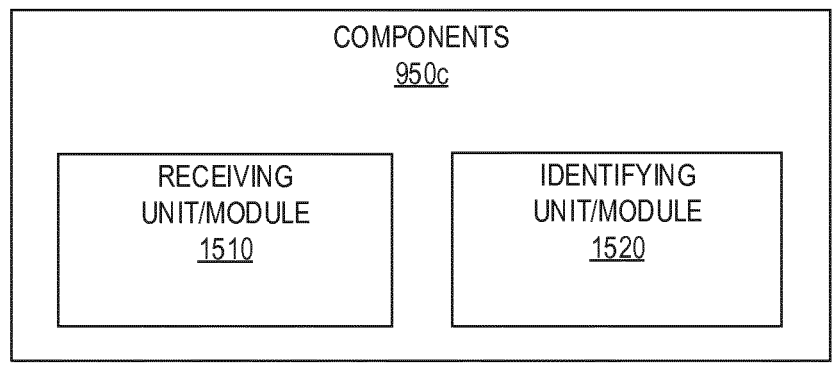

According to other embodiments, the hardware 900 may be comprised in a UE 105 and configured with the example components 950c illustrated in FIG. 15. The components 950c include a receiving unit or module 1510 and an identifying unit or module 1520. The receiving unit or module 1510 is configured to receive, from an access node 110, an SFI for a plurality of slots 68, each of which is configurable to include both uplink and downlink symbols. The SFI specifies a number of downlink symbols in each of the slots 68 and whether or not each of the slots 68 includes an unspecified number of uplink symbols. The identifying unit or module 1520 is configured to identifying the plurality of slots 68 based on a block size and a repetition factor signaled from the access node 110.

Figure 16:
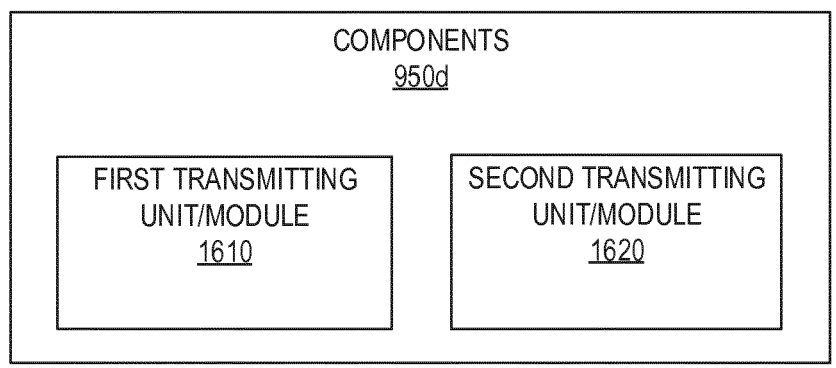

According to other embodiments, the hardware 900 may be comprised in an access node 110 and configured with the example components 950d illustrated in FIG. 16. The components 950d include a first transmitting unit or module 1610 and a second transmitting unit or module 1620. The first transmitting unit or module 1610 is configured to transmit, to a UE 105, an SFI for a plurality of slots 68, each of which is configurable to include both uplink and downlink symbols. The SFI specifies a number of downlink symbols in each of the slots 68 and whether or not each of the slots 68 includes an unspecified number of uplink symbols. The second transmitting unit or module 1620 is configured to transmit, to the UE 105, a block size and repetition factor that identifies the plurality of slots 68 to the UE 105.

Figure 17:
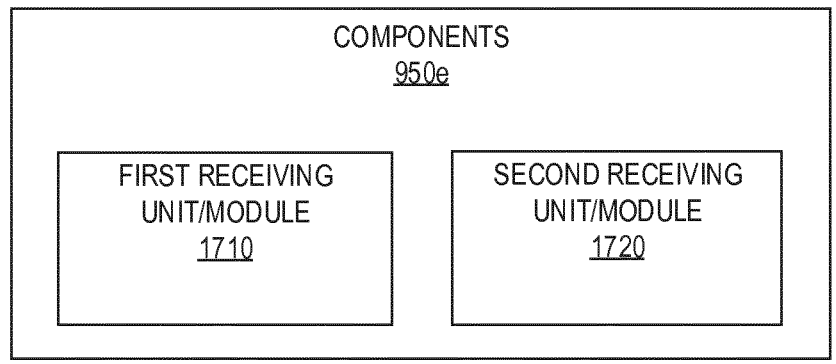

According to other embodiments, the hardware 900 may be comprised in a UE 105 and configured with the example components 950e illustrated in FIG. 17. The components 950e include a first receiving unit or module 1710 and a second receiving unit or module 1720. The first receiving unit or module 1710 is configured to receive, from an access node 110, an SFI for a slot 68a that is configurable to include both uplink and downlink symbols. The SFI specifies a number of downlink symbols in the slot 68a and whether or not the slot 68a includes an unspecified number of uplink symbols. The second receiving unit or module 1720 is configured to receive further control signaling from the access node 110 indicating whether the SFI or a further SFI applies to a subsequent slot 68b that is configurable to include both uplink and downlink symbols.

According to another embodiment in which the hardware 900 is comprised in an access node 110 and configured with the example components 950d illustrated in FIG. 16, the first transmitting unit or module 1610 is configured to transmit, to a UE 105, an SFI for a slot 68a that is configurable to include both uplink and downlink symbols. The SFI specifies a number of downlink symbols in the slot 68a and whether or not the slot 68a includes an unspecified number of uplink symbols. The second transmitting unit or module 1620 is configured to transmit further control signaling to the UE 105 indicating whether the SFI or a further SFI applies to a subsequent slot 68b that is configurable to include both uplink and downlink symbols.

Figure 20:
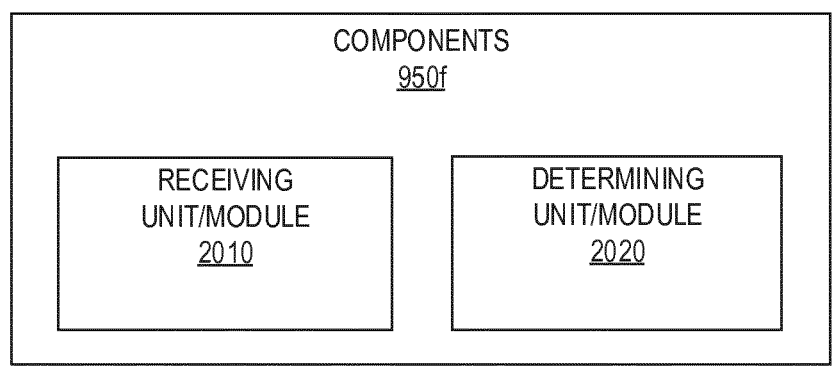

According to other embodiments, the hardware 900 may be comprised in a UE 105 and configured with the example components 950f illustrated in FIG. 20. The components 950f include a receiving unit or module 2010 and a determining unit or module 2020. The receiving unit or module 2010 is configured to receive, from an access node 110, an SFI for a slot 68a in which each symbol is independently configurable as one of multiple possible symbol types. The types include an uplink symbol, a downlink symbol, and a different symbol. The SFI specifies a number of downlink symbols in the slot 68a and a number of uplink symbols in the slot 68a, and indicates whether or not the slot 68a includes an unspecified number of different symbols. The determining unit or module 2020 is configured to determine the type of each of the symbols in the slot 68a based on the number of uplink symbols and the number of downlink symbols.

Figure 21:
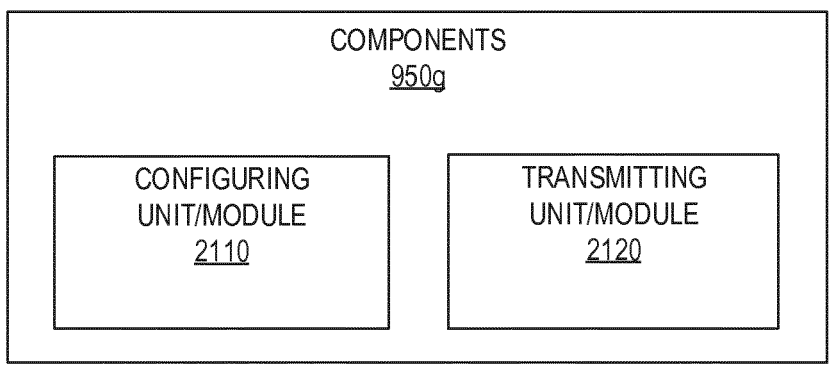

According to other embodiments, the hardware 900 may be comprised in an access node 110 and configured with the example components 950g illustrated in FIG. 21. The components 950g include a configuring unit or module 2110 and a transmitting unit or module 2120. The configuring unit or module 2110 is configured to configure, for a UE 105, each symbol in a slot 68a individually as one of multiple possible symbol types. The types include an uplink symbol, a downlink symbol, and a different symbol. The transmitting unit or module 2120 is configured to transmit, to the UE 105, an SFI specifying a number of downlink symbols in the slot 68a and a number of uplink symbols in the slot 68a, and indicating whether or not the slot 68a includes an unspecified number of different symbols.

Embodiments of the present disclosure may additionally or alternatively include one or more aspects of the claims enumerated below, and/or any compatible combination of features described herein. The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

What is claimed is:

1. A method, implemented by a user equipment (UE) in a wireless communication system, the method comprising:

receiving, from an access node, a slot format indicator (SFI) for a slot in which each symbol is independently configurable as one of multiple possible symbol types, the types comprising an uplink symbol, a downlink symbol, and a different symbol, wherein the SFI specifies a number of downlink symbols in the slot and a number of uplink symbols in the slot, and indicates whether or not the slot includes an unspecified number of different symbols;

receiving further control signaling, from the access node, indicating whether the SFI or a further SFI applies to a subsequent slot in which each symbol is independently configurable as one of the multiple possible symbol types, wherein the further control signaling comprises a block size and a repetition factor;

identifying a first plurality of slots to which the SFI applies based on the block size and repetition factor; and determining the type of each of the symbols in the slot based on the number of uplink symbols and the number of downlink symbols.

2. The method of claim 1, wherein the SFI indicates that an unspecified number of different symbols is included in the slot.

3. The method of claim 1, further comprising monitoring a predefined symbol in the slot for a control resource set that overrides the SFI, irrespective of the type determined for the predefined symbol based on the SFI.

4. The method of claim 1, further comprising receiving, from the access node, an update to one of the block size or the repetition factor, and in response, identifying a second plurality of slots to which the SFI applies based on the block size or repetition factor that was updated and the block size or repetition factor that was not updated.

5. A method, implemented by an access node in a wireless communication system, the method comprising:

configuring, for a user equipment (UE), each symbol in a slot individually as one of multiple possible symbol types, the types comprising an uplink symbol, a downlink symbol, and a different symbol;

transmitting, to the UE, a slot format indicator (SFI) specifying a number of downlink symbols in the slot and a number of uplink symbols in the slot, and indicating whether or not the slot includes an unspecified number of different symbols;

transmitting, to the UE, further control signaling indicating whether the SFI or a further SFI applies to a subsequent slot in which each symbol is independently configurable as one of the multiple possible symbol types, wherein the further control signaling comprises a block size and a repetition factor that identify a first plurality of slots to which the SFI applies.

6. The method of claim 5, wherein the SFI indicates that the unspecified number of different symbols is included in the slot.

7. The method of claim 5, further comprising transmitting a control resource set that overrides the SFI in a predefined symbol of the slot irrespective of the type configured for the predefined symbol.

8. The method of claim 5, further comprising transmitting, to the UE, an update to one of the block size or the repetition factor, wherein the block size or repetition factor that was updated and the block size or repetition factor that was not updated identify a second plurality of slots to which the SFI applies.

9. A user equipment (UE) in a wireless communication system, the UE comprising:

a processor and a memory, the memory containing instructions executable by the processor whereby the UE is configured to:

receive, from an access node, a slot format indicator (SFI) for a slot in which each symbol is independently configurable as one of multiple possible symbol types, the types including an uplink symbol, a downlink symbol, and a different symbol, wherein the SFI specifies a number of downlink symbols in the slot and a number of uplink symbols in the slot, and indicates whether or not the slot includes an unspecified number of different symbols;

receive further control signaling, from the access node, indicating whether the SFI or a further SFI applies to a subsequent slot in which each symbol is independently configurable as one of the multiple possible symbol types, wherein the further control signaling comprises a block size and a repetition factor;

identify a first plurality of slots to which the SFI applies based on the block size and repetition factor;

determine the type of each of the symbols in the slot based on the number of uplink symbols and the number of downlink symbols.

10. The UE of claim 9, wherein the SFI indicates that an unspecified number of different symbols is included in the slot.

11. The UE of claim 9, further configured to monitor a predefined symbol in the slot for a control resource set that overrides the SFI, irrespective of the type determined for the predefined symbol based on the SFI.

12. The UE of claim 9, further configured to receive, from the access node, an update to one of the block size or the repetition factor, and in response, identify a second plurality of slots to which the SFI applies based on the block size or repetition factor that was updated and the block size or repetition factor that was not updated.

13. An access node in a wireless communication system, the access node comprising:

a processor and a memory, the memory containing instructions executable by the processor whereby the access node is configured to:

configure, for a user equipment (UE), each symbol in a slot individually as one of multiple possible symbol types, the types including an uplink symbol, a downlink symbol, and a different symbol;

transmit, to the UE, a slot format indicator (SFI) specifying a number of downlink symbols in the slot and a number of uplink symbols in the slot, and indicating whether or not the slot includes an unspecified number of different symbols;

transmit, to the UE, further control signaling indicating whether the SFI or a further SFI applies to a subsequent slot in which each symbol is independently configurable as one of the multiple possible symbol types, wherein the further control signaling comprises a block size and a repetition factor that identify a first plurality of slots to which the SFI applies.

14. The access node of claim 13, wherein the SFI indicates that the unspecified number of different symbols is included in the slot.

15. The access node of claim 13, further configured to transmit a control resource set that overrides the SFI in a predefined symbol of the slot irrespective of the type configured for the predefined symbol.

16. The access node of claim 13, further configured to transmit, to the UE, an update to one of the block size or the repetition factor, wherein the block size or repetition factor that was updated and the block size or repetition factor that was not updated identify a second plurality of slots to which the SFI applies.

17. A non-transitory computer readable medium storing a computer program product for controlling a programmable user equipment (UE) in a wireless communication system, the computer program product comprising software instructions that, when run on the programmable UE, cause the programmable UE to:
- receive, from an access node, a slot format indicator (SFI) for a slot in which each symbol is independently configurable as one of multiple possible symbol types, the types comprising an uplink symbol, a downlink symbol, and a different symbol, wherein the SFI specifies a number of downlink symbols in the slot and a number of uplink symbols in the slot, and indicates whether or not the slot includes an unspecified number of different symbols;
- receive further control signaling, from the access node, indicating whether the SFI or a further SFI applies to a subsequent slot in which each symbol is independently configurable as one of the multiple possible symbol types, wherein the further control signaling comprises a block size and a repetition factor;
- identify a first plurality of slots to which the SFI applies based on the block size and repetition factor; and
- determine the type of each of the symbols in the slot based on the number of uplink symbols and the number of downlink symbols.

18. A non-transitory computer readable medium storing a computer program product for controlling a programmable access node in a wireless communication system, the computer program product comprising software instructions that, when run on the programmable access node, cause the programmable access node to:
- configure, for a user equipment (UE), each symbol in a slot individually as one of multiple possible symbol types, the types comprising an uplink symbol, a downlink symbol, and a different symbol;
- transmit, to the UE, a slot format indicator (SFI) specifying a number of downlink symbols in the slot and a number of uplink symbols in the slot, and indicating whether or not the slot includes an unspecified number of different symbols;
- transmit, to the UE, further control signaling indicating whether the SFI or a further SFI applies to a subsequent slot in which each symbol is independently configurable as one of the multiple possible symbol types, wherein the further control signaling comprises a block size and a repetition factor that identify a first plurality of slots to which the SFI applies.

* * * * *

UNITED STATES PATENT AND TRADEMARK OFFICE
CERTIFICATE OF CORRECTION

PATENT NO. : 11,356,218 B2
APPLICATION NO. : 16/637842
DATED : June 7, 2022
INVENTOR(S) : Falahati et al.

It is certified that error appears in the above-identified patent and that said Letters Patent is hereby corrected as shown below:

In the Specification

In Column 11, Line 62, delete "fora" and insert -- for a --, therefor.

In the Claims

In Column 15, Line 18, in Claim 2, delete "an unspecified number of different symbols" and insert -- the unspecified number of different symbols --, therefor.

In Column 16, Lines 19-20, in Claim 10, delete "an unspecified number of different symbols" and insert -- the unspecified number of different symbols --, therefor.

Signed and Sealed this
Fourteenth Day of February, 2023

Katherine Kelly Vidal
*Director of the United States Patent and Trademark Office*